United States Patent [19]

Lovrenich

[11] Patent Number: 4,858,102
[45] Date of Patent: Aug. 15, 1989

[54] DISTRIBUTED LOGIC CONTROL SYSTEM AND METHOD

[75] Inventor: Rodger T. Lovrenich, Santa Teresa, N. Mex.

[73] Assignee: El Paso Technologies Company, El Paso, Tex.

[21] Appl. No.: 38,018

[22] Filed: Apr. 14, 1987

Related U.S. Application Data

[63] Continuation-in-part of Ser. No. 757,279, Jul. 19, 1985, abandoned.

[51] Int. Cl.⁴ .............................................. G06F 15/46
[52] U.S. Cl. .................................. 364/136; 364/141; 364/147; 364/176; 364/183; 364/184; 364/474.11; 364/474.16; 364/474.19; 364/478
[58] Field of Search ............... 307/149; 364/167, 188, 364/474, 170, 136, 176, 475, 478, 141, 183, 184, 148, 152, 147, 140

[56] References Cited

U.S. PATENT DOCUMENTS

| | | | |
|---|---|---|---|
| Re. 31,247 | 5/1983 | Johnstone | 364/474 |
| 3,765,763 | 10/1973 | Nygaard | 355/100 |
| 4,306,292 | 12/1981 | Head, III | 364/468 |
| 4,314,329 | 2/1982 | Crewe et al. | 364/900 |
| 4,486,830 | 12/1984 | Taylor, Jr. et al. | 364/141 |
| 4,509,123 | 4/1985 | Vereen | 364/300 |
| 4,535,456 | 8/1985 | Bauer et al. | 364/900 |
| 4,550,366 | 10/1985 | Toyama et al. | 364/900 |
| 4,608,628 | 8/1986 | Saito et al. | 364/141 |
| 4,718,025 | 1/1988 | Minor et al. | 364/550 |

FOREIGN PATENT DOCUMENTS 0141858 5/1985 European Pat. Off. .
3305807 9/1983 Fed. Rep. of Germany .

OTHER PUBLICATIONS

"Machine Diagnostics Add to PC Productivity Gains", 30 Control Engineering No. 1, 156–162 (Jan. 1983).
"Diagnose an Werkzeugmaschinen und Fertigungsüberwachung" 115 Werkstatt und Betrieb Heft 6, 353–363 (Jun. 82).
"Fehlerdiagnose mit Bildschirm-Textangabe an Sonder-Werkzeugmaschinen", 115 Werkstatt und Betrieb, Heft 6, 365–366 (Jun. 82).

Primary Examiner—John R. Lastova
Attorney, Agent, or Firm—Donald J. Lisa

[57] ABSTRACT

A system and method for controlling operation of a plurality of elements in an automated process, such as a production process, and indicating error conditions as they occur. Each unique set of input and output conditions of the various system elements defines a unique logic state or zone. Thus, there are defined a multiplicity of valid system logic states or zones, each having a unique input/output image. A predetermined sequence of zones, productive zones representing designed machine operations, is stored in a zone table. All zones not explicitly defined in the zone table are automatically treated as error zones. A zone engine automatically cycles to observe any change in input/output image. Any change in inputs from the various system elements automatically transfer action to the unique zone associated with such inputs, resulting in corresponding changes in control outputs to the system elements and/or display an error message as appropriate.

27 Claims, 7 Drawing Sheets

MECHANISM ZONE TABLE

MECHANISM NAME ___SLIDE___
APPLICABLE STATIONS _____

| Zone Numbers (REF) | Zone Names | INPUT=1 / OUTPUT=0 — I/O TYPE — I/O NAMES | | ADVANCED UNIT SWITCH | RETURNED UNIT SWITCH | ADVANCE MOTION PWR | RETURN MOTION PWR | | | | |
|---|---|---|---|---|---|---|---|---|---|---|---|
| | | 1 | 1 | 0 | 0 | | | | | | |
| 1 | RETURNED | 0 | 1 | 0 | 0 | | | | | | |
| 2 | STOPPED BETWEEN | 0 | 0 | 0 | 0 | | | | | | |
| 3 | ADVANCED | 1 | 0 | 0 | 0 | | | | | | |
| 4 | ADVANCING FROM RETURNED | 0 | 1 | 1 | 0 | | | | | | |
| 5 | ADVANCING BETWEEN | 0 | 0 | 1 | 0 | | | | | | |
| 6 | ADVANCING ON TO ADVANCED | 1 | 0 | 1 | 0 | | | | | | |
| 7 | RETURNING ONTO RETURNED | 0 | 1 | 0 | 1 | | | | | | |
| 8 | RETURNING BETWEEN | 0 | 0 | 0 | 1 | | | | | | |
| 9 | RETURNING FROM ADVANCED | 1 | 0 | 0 | 1 | | | | | | |
| 10 | ERROR | X | X | 0 | 0 | | | | | | |

LEGEND: [0] MUST BE OFF   [1] MUST BE ON   [X] IGNORE

FIG. 4B

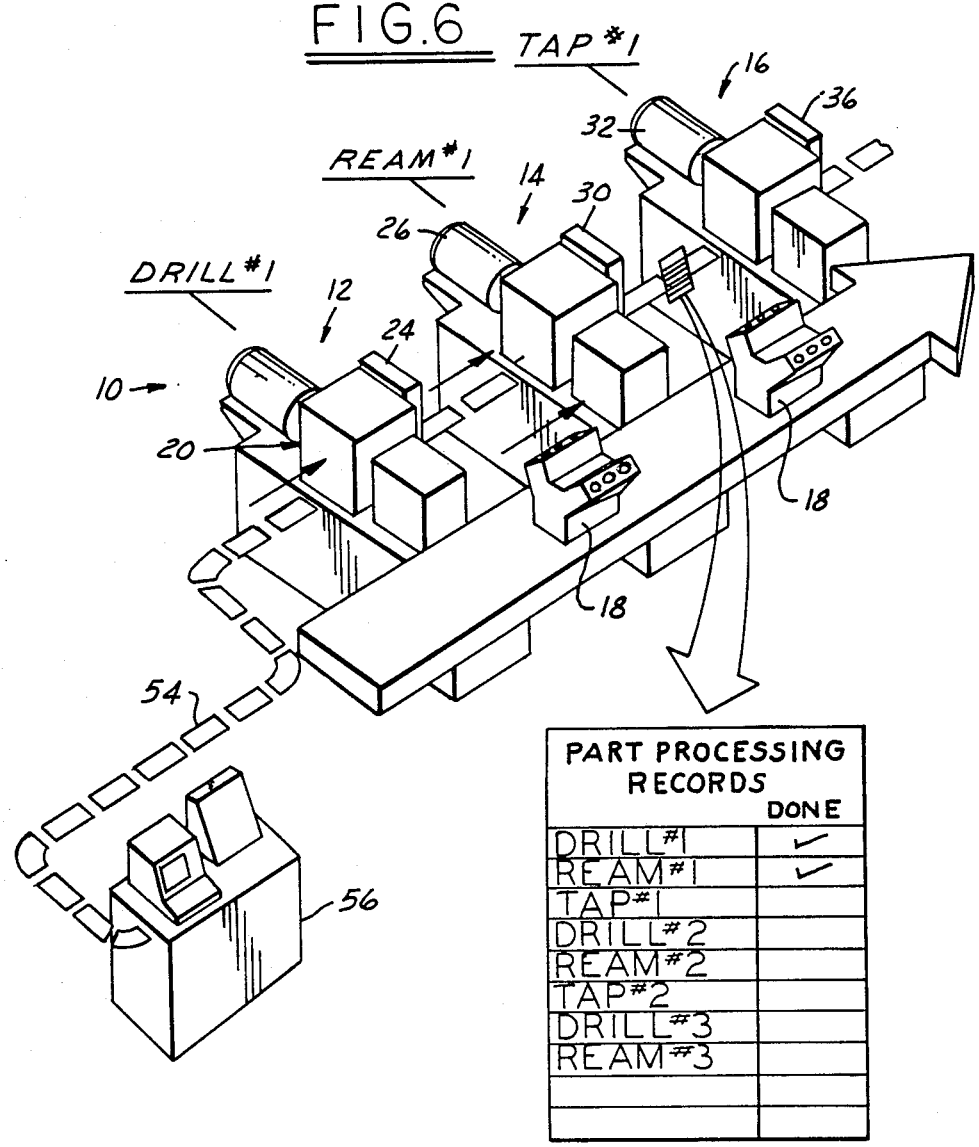

MECHANISM ZONE TABLE

MECHANISM NAME: _____
STATION NAME: __5L__

I/O TYPE
I = PHYSICAL INPUT
C = COMMAND INPUT
O = PHYSICAL OUTPUT
R = REQUEST OUTPUT
M = MOS (MACHINE OPERATING SYSTEM) OUTPUTS

ZONE NUMBERS (REF)

I/O NAMES ②

| ZONE NAMES ① | ERROR RESET | ADVANCE SLIDE | RETURN SLIDE |
|---|---|---|---|
| | C | C | C |
| 1 INITIALIZING | X | X | X |
| 2 RETURNED | X | 0 | X |
| 3 ADVANCING FROM RETURNED | X | 1 | X |
| 4 ADVANCING BETWEEN | X | 1 | X |
| 5 ADVANCED | X | X | 0 |
| 6 RETURNING FROM ADVANCED | X | X | 1 |
| 7 RETURNING BETWEEN | X | X | 1 |
| 8 STOPPED BETWEEN | X | 0 | 0 |
| 9 COASTING TO STOP | X | X | X |
| 10 ERROR DEFAULT ③ | 0 | X | X |

LEGEND:  [0] MUST BE OFF   [1] MUST BE ON

FIG. 7A

| MECHANISM ZONE TABLE | MECHANISM NAME: _____ STATION NAME: _____ | | | | | | | |
|---|---|---|---|---|---|---|---|---|

| ZONE NUMBERS (REF) | I/O TYPE<br>I = PHYSICAL INPUT<br>C = COMMAND INPUT<br>O = PHYSICAL OUTPUT<br>R = REQUEST OUTPUT<br>M = MOS (MACHINE OPERATING SYSTEM) OUTPUTS | ERROR RESET | ADVANCE SLIDE | RETURN SLIDE | ADVANCED UNIT SWITCH | RETURNED UNIT SWITCH | | |
|---|---|---|---|---|---|---|---|---|
| | ZONE NAMES ① | C | C | C | I | I | | |
| 1 | INITIALIZING | X | X | X | X | X | | |
| 2 | RETURNED | X | 0 | X | 0 | 1 | | |
| 3 | ADVANCING FROM RETURNED | X | 1 | X | 0 | 1 | | |
| 4 | ADVANCING BETWEEN | X | 1 | X | 0 | 0 | | |
| 5 | ADVANCED | X | X | 0 | 1 | 0 | | |
| 6 | RETURNING FROM ADVANCED | X | X | 1 | 1 | 0 | | |
| 7 | RETURNING BETWEEN | X | X | 1 | 0 | 0 | | |
| 8 | STOPPED BETWEEN | X | 0 | 0 | 0 | 0 | | |
| 9 | COASTING TO STOP | X | X | X | X | X | | |
| 10 | ERROR: DEFAULT | 0 | X | X | X | X | | |

LEGEND: ⓪ MUST BE OFF  ① MUST BE ON

TRANSITION TO ERROR ZONE CAUSES MESSAGE PROCESS TO COMPOSE AN ERROR MESSAGE

FIG. 9A

DISTRIBUTED LOGIC CONTROL SYSTEM AND METHOD

This application is a continuation-in-part of application Ser. No. 757,279 filed July 19, 1985 now abandoned. Reference is also made to U.S. Pat. Nos. 4,621,200 issued Nov. 4, 1986, and 4,705,900 issued Nov. 10, 1987; and to co-pending application 757,225 filed July 19, 1985.

The present invention relates to systems and methods for controlling automated production lines and the like.

BACKGROUND OF THE INVENTION

Automated production lines typically include many stations at which work is performed on a workpiece by a series of tools. A workpiece is clamped in position at each work station, and the tools at the several work stations engage the workpieces. The tool is then withdrawn at each work station, and the workpieces are unclamped and transferred simultaneously to the next work stations by a single transfer mechanism. The automotive industry is an example of an industry with high usage of automated production lines to produce engine blocks, for example. An engine block casting is passed successively through a series of work stations which mill, bore, drill, hone, gage, etc. It is not uncommon to have sixty work stations in such an automated production line. The times required to perform the several operations may be different, but the parts cannot be unclamped and transferred until all stations are finished because motion of a single transfer mechanism moves all parts.

Individual machine control systems generally include an automatic mode of operation wherein the machine is automatically cycled through a work sequence. Relay ladder logic commonly has been used to define the machine sequences, whether the logic is effected by relays or programmable controllers. The typical relay ladder logic diagram is a massive listing of relay, switch and solenoid conditions without an indication of logic flow which, while easy to read, is difficult to translate into the logic conditions intended to be represented. In addition, a large number of implied conditions exist that are not depicted. For example, a relay ladder with twenty elements (switches, relays, solenoids, etc.) embraces well over one million possible combinations of conditions. As a practical matter only a small fraction of these conditions, those necessary to make the system work, are considered by the machine designer and encoded into the logic scheme. Potential problems abound. Some planned conditions may be omitted, and unplanned conditions may be present, all with potentially serious consequences.

The programmable logic controller (PLC) was introduced with the hope that the massive racks of relays wired together in a permanent logic network could be replaced by a more reliable, smaller and readily reprogrammable electronic package. Although the PLC was designed to replace relay controls, its design explicitly seeks to replicate, in the design media, the relay ladder logic used by the technicians. Reprogrammability has proven to be a mixed blessing. Initial reprogramming is always needed as the system is set up and to meet product design changes. Any change made to the program logic requires a corresponding modification to associated diagnostic programming so the latter can properly reflect errors in the altered logic. The ease of making changes can allow modifications to be made by any semi-qualified person. Unfortunately, there is often no recorded of changes made, and there is therefore the possibility that the documentation may not reflect the actual program. This is a sufficiently serious problem for many production facilities that they are investing heavily in add-on equipment to monitor program changes. Furthermore, the increase in number of Input/Output (I/O) points desired by users and consequent greater complexity of controls have driven PLC manufacturers to push the PLC design to larger and larger units. These very large units are well designed to meet the needs of central chemical plant control rooms, for example, but are too slow for the fast-cycle automation, such as transfer lines.

A significant cost of automated production lies in system "down-time"—i.e. time in which the automated system is non-productive—which may range between 50% and 60% during production shifts. Total down-time may be visualized as consisting of three segments: diagnosis, repair and restart. Analyses show that there are many causes of down-time including: many potential sources of unintended stoppage, variable delays in bringing the appropriate skills to bear on the problem, repair times that vary from minutes to hours, and a significant restart time needed to return the machine to a "ready for automatic cycle" condition after all repairs have been made. Down-time is a direct consequence of the high degree of complexity required to perform a large number of machining and part handling operations with the minimum of operator intervention. While lower equipment failure rates are a high priority objective, it is widely believed that reducing time to return to production—i.e., restart time—is the major area of opportunity for improvement.

Thus, a particular problem which has plagued the art involves restart of an automated system after shutdown. Typically, operators or technicians must examine the status of workpieces at the individual stations and manually cycle the individual stations so that all stations are at a common point in the overall operating cycle. In a system which includes sixty work stations, for example, substantial time is required to restart the system in this manner after shutdown. Furthermore, in the event that an error is made and a workpiece is transferred to the next work station without the previous operation having been performed, substantial damage is likely to both the workpiece and the operating mechanism at the station, resulting not only in further shutdown of the system but in costly repair.

OBJECTS AND SUMMARY OF THE INVENTION

It is therefore a general object of the present invention to provide a control system and method of the described type which are characterized by increased efficiency, speed and reliability, and by decreased cost and complexity.

A more specific object of the invention is to provide a distributed machine control system and method which are constructed in such a way as to be automatically self-diagnostic or "autonostic" in operation, which provide to the operator a clear concise English-language explanation of the cause of failure, and which are thus effective in reducing time required to diagnose the cause of a system failure.

A further and yet more specific object of the invention is to provide a control system and method wherein each work station contains a complete history of system operations performed on the workpiece at that station, so that the work station will not perform its operation on the workpiece in the event that preceding prerequisite operations have not been performed, and so that the system restart can be implemented automatically without requiring visual inspection and manual intervention by operators or technicians.

The present invention is directed to a system and method for controlling operation of a plurality of elements in an automated process, such as a production process, and indicating error conditions as they occur. In accordance with the invention, the machine system is divided into a plurality of individually controlled "mechanisms." A "mechanism" is a single action device—i.e., having a single motion—which cannot interfere with itself. In the example discussed in detail, such mechanism comprises a ream slide which moves toward a workpiece to bring the reaming bit into working engagement, and then moves to a returned position spaced from the workpiece so that the piece may be transferred. The ream motor carried by the slide, if controlled, would be a separate "mechanism" because a different motion is involved. Likewise, the workpiece clamp at the reaming station would comprise a separate "mechanism."

Each unique set of input and output conditions of the various mechanism elements defines a unique logic state or zone. Thus, there are defined a multiplicity of valid mechanism logic states or zones, each having a unique input/output image and each corresponding to a valid physical state of the mechanism. A predetermined set of zones, productive zones representing designed mechanism operating states, is stored in a zone table. All zone not explicitly defined in the zone table are automatically treated as error zones. A zone engine automatically cycles to observe any change in mechanism input/output image. Any change in inputs from the various mechanism elements automatically transfers action to the unique zone associated with such inputs, resulting in corresponding changes in control outputs to the mechanism elements and/or display of an error message as appropriate. Thus operation is automatically transferred among valid zones, including the error zone, along a plurality of allowed or available paths.

Zone logic operation so described possesses a number of distinct advantages over the art. For example, every change in I/O image automatically transfers operation to a succeeding zone. If the next zone is a valid zone, operation proceeds. However, if the next zone is an error zone, the I/O image which led to entry into the error zone provides a ready, indication of the source of mechanism failure. Therefore diagnostics are necessary. Furthermore, by programming the system mechanism as a function of constraints rather than timed actions, the individual mechanisms, and hence the overall system, automatically operate at maximum speed.

In accordance with another feature of the invention for automatic generation of error messages, each logic zone and each input/output image has associated therewith a verbal description according to its function, for example "valve seat ream mechanical slide" in the example of the disclosure. Motion or action zones have associated verb phases, such as "advancing between" and input and output (I/O) elements are named with nouns such as "advanced limit switch", etc. The zone engine continually examines the actions taking place or the lack of action, and the conditions of the mechanism elements. When a fault occurs, i.e. when the combination of action and element conditions does not represent a productive situation, the names of the zones and inputs and outputs are combined to automatically compose a unique readily understood error message complete with verbs, nouns and objects in accordance with standard language construction. If system programming is changed by the designer, the diagnostics and error message composition automatically follow with no additional programming. The system will automatically compose its own unique error message in accordance with the changes.

A machine control system in accordance with a preferred embodiment of the present invention includes a plurality of work stations each for performing a preselected operation on a workpiece, such as drilling, reaming or tapping a hole, and a transfer mechanism for transferring a series of workpieces among the work stations in a predetermined sequence. Each of the work stations includes at least one mechanism for performing the preselected operation on a workpiece at the associated work station and an electronic controller for controlling operation of the mechanism. The electronic controllers are electrically serially interconnected to each other. Each controller includes a system memory section which includes a complete record of operations performed on all workpieces in the system. This record is updated following each machine cycle. Thus, in the event of shut-down, each station contains information necessary for restart relative to the workpiece at that station.

In accordance with another feature of the invention, the part history record is employed at each work station to inhibit operation of the mechanism in the event that prerequisite previous operations have not been performed. For example, in the example of a valve seat reaming station, operation of the reaming slide against the workpiece is inhibited if the history of the workpiece indicates that the hole has not been drilled at a previous station.

BRIEF DESCRIPTION OF THE DRAWINGS

The invention, together with additional objects, features and advantages thereof, will be best understood from the following description, the appended claims and the accompanying drawings in which:

FIG. 4B is a corresponding zone table illustration;

FIG. 6 is a schematic diagram illustrating transmission of part history indicia between work station controllers;

DETAILED DESCRIPTION OF PREFERRED EMBODIMENT

Figure 1:
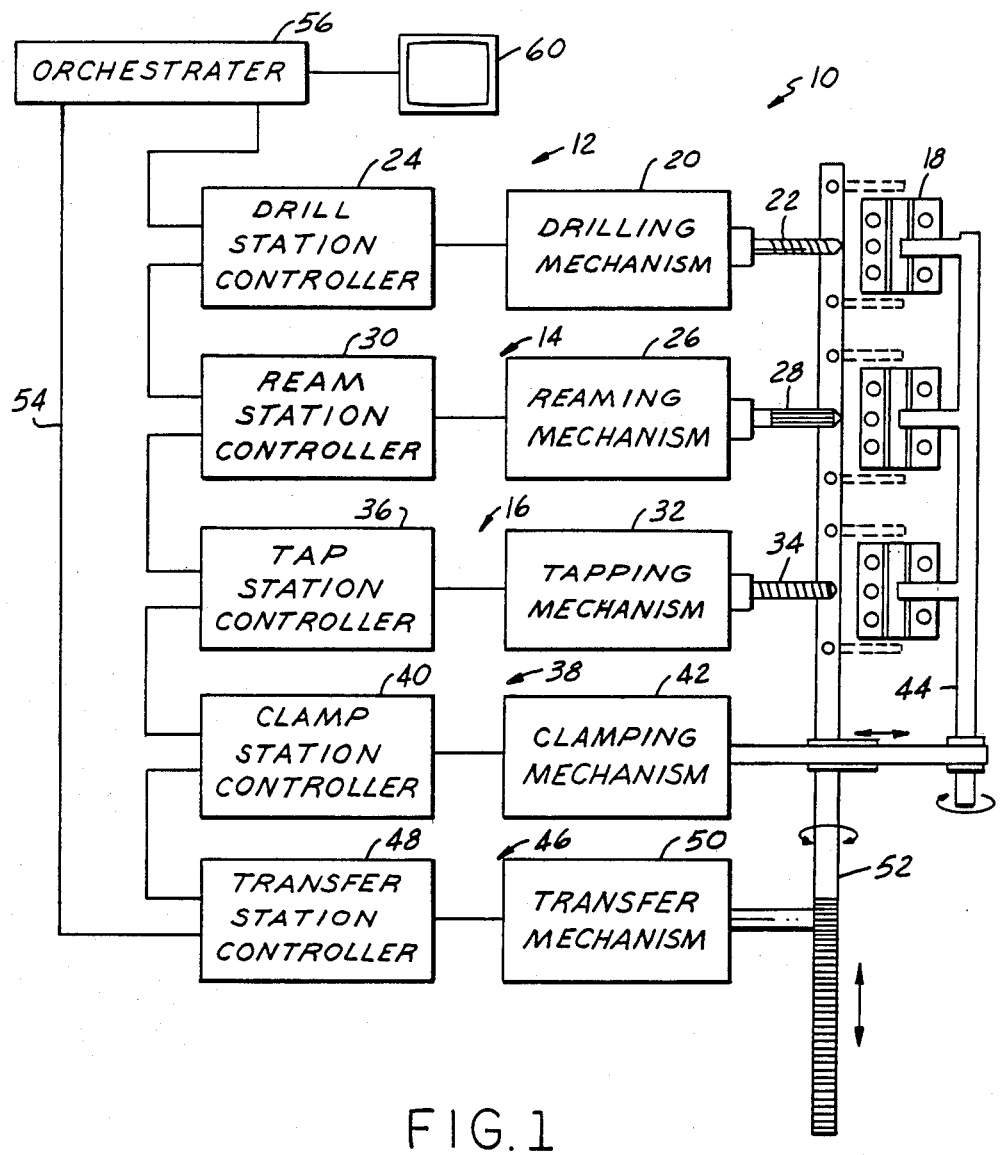
FIG. 1 is a functional block diagram of a machine control system embodying the present invention.

FIG. 1 illustrates a machine control system 10 in accordance with an exemplary embodiment of the invention as comprising a series of work stations 12, 14, 16 for sequentially performing operations on a continuing series of workpieces 18 such as engine blocks. Work station 12 in the exemplary embodiment of FIG. 1 comprises a drilling station which includes a drilling mechanism 20 coupled to bit 22 for drilling a hole at a preselected location in a workpiece 18 and controlled by a drill station controller 24. Likewise, work station 14 (FIGS. 1 and 2) comprises a reaming station which includes a reaming mechanism 26 with a bit 28 for reaming the hole drilled at station 22, and a ream station controller 30 coupled to mechanism 26. Work station 16 includes a tapping mechanism 32 having a bit 34 for tapping the hole drilled at station 12 and reamed at station 14, and a controller 36 coupled to tapping mechanism 32. Station controllers 24, 30, 36, 40 and 48 are serially connected in a communication loop 54 with an orchestrator computer 56 for controlling operation among the various work stations. Orchestrator 56 is coupled to a display 60 for indicating status, including system error messages, to an operator.

System 10 further includes a clamping station 38 with a controller 40 coupled through a clamping mechanism 42 to a clamping bar 44 or the like for selectively clamping workpieces 18 at stations 12–16, or for unclamping the workpieces for transfer between sequential stations. A transfer station 46 includes a transfer station controller 48 coupled through a transfer mechanism 50 to a bar 52 for selectively engaging workpiece 18 with clamp 44 retracted and moving workpieces 18 between stations 12, 14, 16 in sequence. It will be appreciated, of course, that system 10 illustrated in FIG. 1 is a simplified example of an automated machine system which may include several dozen work stations and a multiplicity of clamping an transferring stations for automated operation on workpieces 18. In this simplified example, there are at least five separately controllable mechanisms—i.e., the slides on which the drill, ream and tap motors are mounted, and the clamping and transfer actuators. It will be understood, however, that each station may include a plurality of controllable mechanisms, which may be coded and operated in the manner to be described without departing from the scope of the invention. Indeed, such expandability is an important advantage of the invention.

Figure 2:
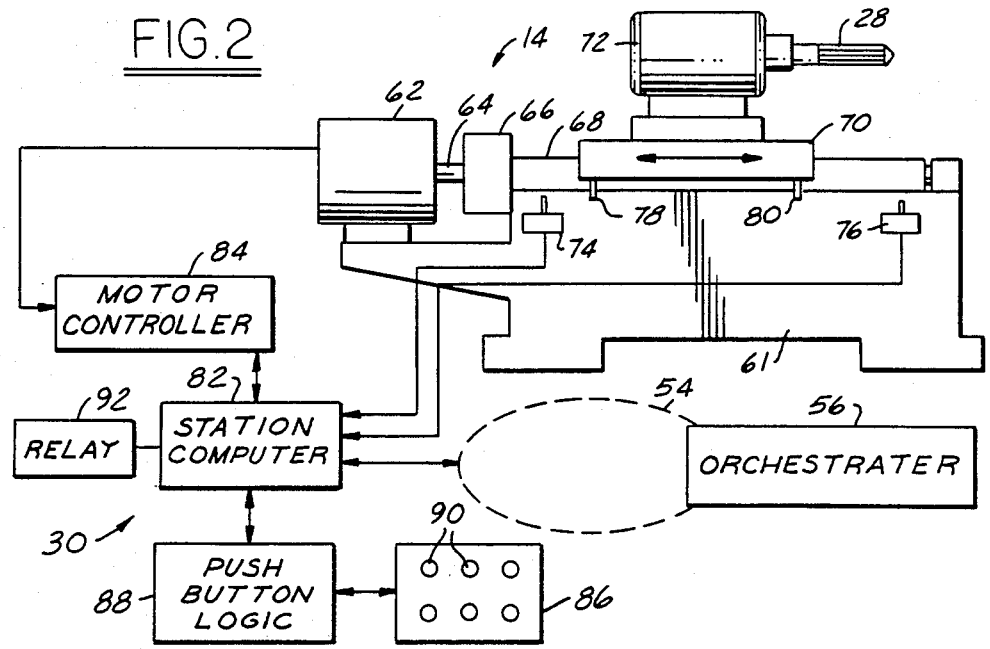
FIG. 2 is a more detailed functional block diagram of the reaming work station in FIG. 1.

FIG. 2 illustrates reaming work station 14 as comprising a base 61 having a reversible electric motor 62 mounted thereon. Motor 62 has an output shaft 64 coupled through a gear transmission 66 to a worm shaft 68. A machine slide 70 is slidably mounted on base 61 in engagement with worm shaft 68. A ream motor 72 rotates ream bit 28 for reaming a pre-drilled hole at a predetermined position in workpiece 18 (FIG. 1). Limit switches 74, 76 are positioned on base 61, and fingers 78, 80 on slide 70 engage limit switches 74, 76 at the extreme limits of travel of the machine slide. Limit switches 74, 76 are connected to the station computer 82 of ream station controller 30. Motor 62 is powered by a motor controller 84 which provides a feedback signal to computer 82 indicative of motor operation. Controller 84 is coupled to station computer 82. Computer 82 is also connected by communications loop 54 to orchestrator 56 (FIG. 1).

The general operation of reaming station 14 requires that slide 70 move off of returned limit switch 74 by energizing motor 62 to rotate lead screw 68 and move slide 70 forward until finger 80 engages advanced limit switch 76. At this point, motor 62 must be stopped and re-energized to rotate warm shaft 68 in the opposite direction for reversing the direction of travel of machine slide 70 until finger 78 engages limit switch 74. A control panel 86 is connected to station computer 82 through logic circuitry 88 and includes pushbuttons 90 which indicate functions such as "start ream motor", "advance slide", "single step", "stop ream motor", "return slide", "automatic", and "manual". A watchdog relay 92 is connected to station computer 82 to shutdown station 14 if an error is detected.

Figure 3:
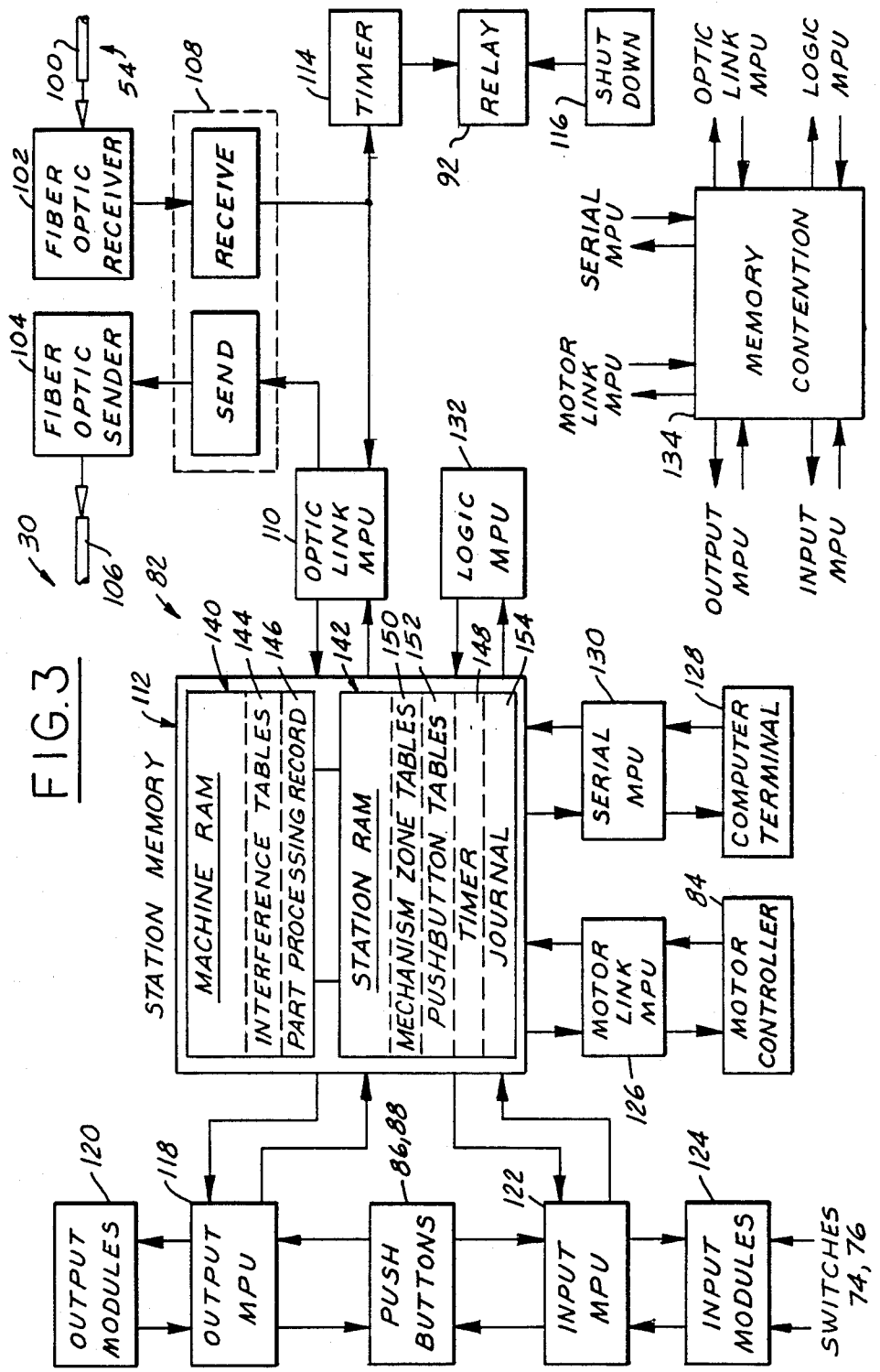
FIG. 3 is a functional block diagram of the reaming station controller in FIGS. 1 and 2.

FIG. 3 is a functional block diagram of ream station controller 30, including ream station computer 82 (FIGS. 1 and 2). Communications loop 54, which preferably comprises an optical communications loop, includes a fiber-optic cable 100 coupled to a fiber-optic receiver 102 in station computer 82 (FIGS. 1–3) for receiving signals from the upstream controller, in this cases drill station controller 24, and a fiber-optic transmitter (sender) 104 coupled by a fiber-optic cable 106 in loop 54 to the downstream controller, in this case tap station controller 36. (The order of interconnection of loop 54 among controllers 24, 30, 36, 40 and 48 is irrelevant.) Transmitter 104 and receiver 102 are coupled through an isolator 108 to an optical link microprocessor unit or MPU 110. MPU 110 interfaces with a memory 112. Input information is stored in memory 112, and may be recalled and processed as desired. The receiver electronics are also coupled to a watchdog timer 114 which is connected to relay 92 (FIGS. 2 and 3) for terminating station operation in the event of a loss of signal on the receiver line. Relay 92 is also responsive to other suitable shutdown electronics 116.

Memory 112 is a public memory that is available to the several MPUs which comprise station computer 82. An output MPU 118 communicates with memory 112 and output modules 120 for connection of output signals to external devices. Output MPU 118 also provides signals to pushbutton logic 88 and operator pushbutton panel 86 (FIGS. 1 and 3). An input MPU 122 receives signals from input modules 124, which are connected to station input devices such as switches 74, 76 in FIG. 2. A motor link MPU 126 couples memory 112 to motor controller 84 (FIGS. 2 and 3). An operator computer terminal 128 is coupled to memory 112 through the serial MPU 130. A logic MPU 132 communicates with memory 112 and executes a prestored operating system for controlling overall station operation. Since several MPUs have access to public memory 112, it is necessary to organize memory access. This is accomplished by the memory contention module 134, which preferably comprises a programmable logic array chip programmed in conventional fashion.

Drill station 12, tapping station 16, clamping station 38 and transfer station 46, and particularly the various station controllers 24, 36, 40 and 48, are preferably structurally similar to ream station 14 hereinabove described in detail in connection with FIGS. 2 and 3, the only difference being in the mechanism for performing work on the workpieces and in the prestored station operation system programs. Structure and operation of controllers 24, 30, 36, 40, 48 and 56 are as disclosed in greater detail in U.S. Pat. No. 4,621,200. Reference is made to such patent for a more detailed discussion of structure of the station controllers.

As illustrated in FIG. 3, memory 112 includes a section 140 of machine RAM in which identical information is stored for all controllers 24, 30, 36, 40 and 48 (FIG. 1), and a section 142 of memory dedicated specifically to that station—e.g., ream station 14. In general, machine RAM 140 is managed by orchestrator 56 (FIGS. 1 and 2) and contains information needed by all station controllers—e.g., station interference tables 144 and part processing record 146. Station RAM 142 is controlled by the station controller and contains information specific to the station in question—e.g., a time-in-zone memory 148, station mechanism zone tables 150, pushbutton logic tables 152 and a station journal 154. The various MPUs of controller 30 (in FIG. 3) can read all data in machine RAM 140, but can vary or update only data associated with station 14. The same is true, of course, for the other station controllers.

Station controllers 24, 30, 36, 40 and 48 are serially connected with orchestrator 56 in a closed communications loop as hereinabove noted, specifically a serial communications loop. Information is continually but separately received and transmitted around the loop by each station computer MPU 110 (FIG. 3). This information is a time division multiplex of command signals from the orchestrator to the various station computers, status information from the work station computers to the orchestrator, and miscellaneous data information including update of part processing records 146. The command, status and data information if contained in a continual series of individual information packets, specifically time division multiplexed digital information packets. Time division multiplexed closed-loop communication among the work station and orchestrator computers as hereinabove described is the subject of copending application Ser. No. 757,225 filed July 19, 1985, to which reference is made for details of implementation.

Figure 4A:
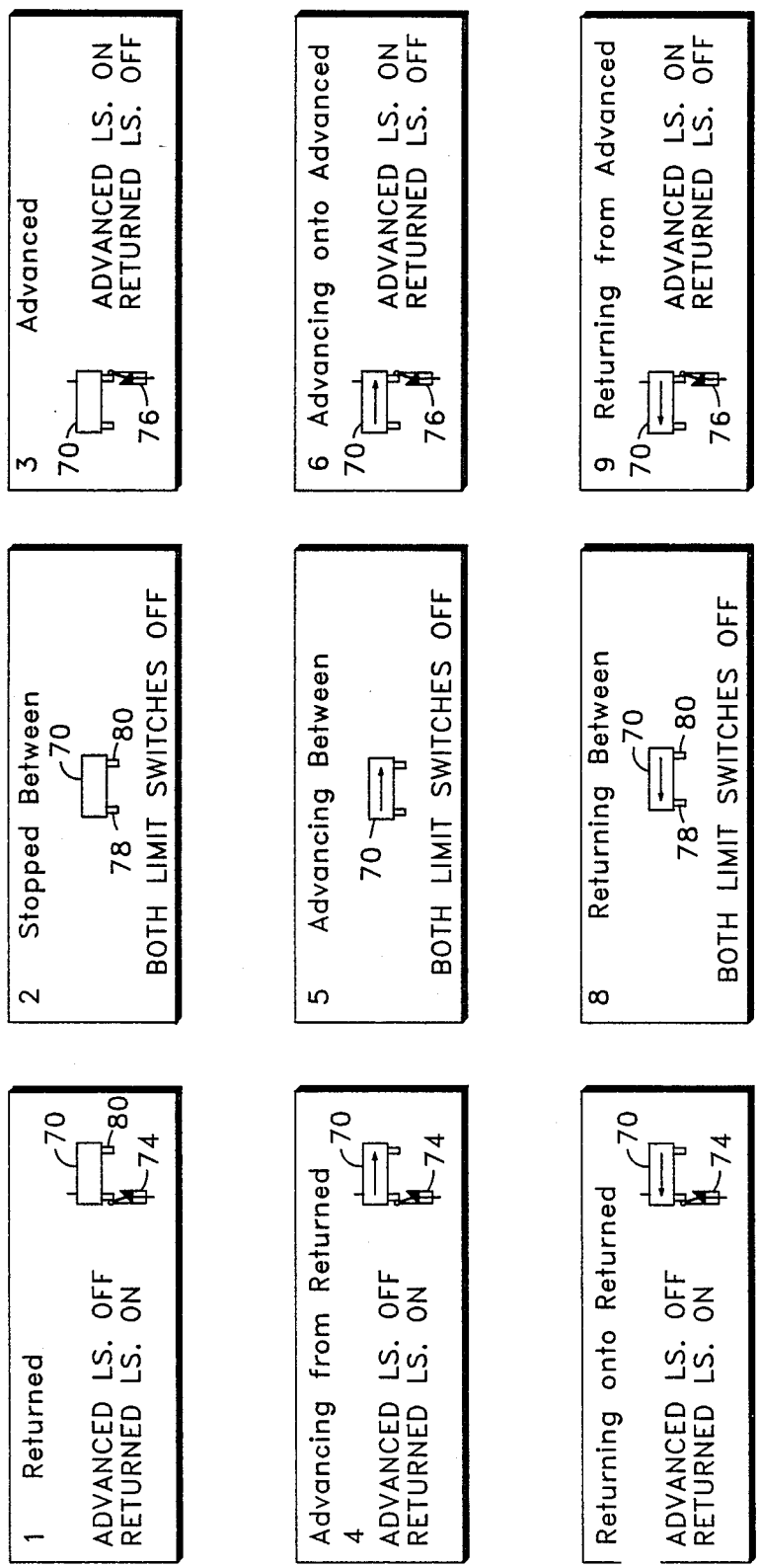
FIG. 4A is a pictorial illustration of valid operating states or zones of the ream slide mechanism of FIG. 2.

FIG. 4A illustrates valid zones of operation of reaming mechanism 26, and FIG. 4B is a zone table of chart listing the valid zones by name with corresponding I/O images. In zone 1, the ream slide 70 is RETURNED, the advanced limit switch 76 is turned off, the returned limit switch 74 is turned on and both advance and return power to motor 62 are turned off. In zone 2, drill slide 70 is STOPPED BETWEEN the advanced and return limit switches, so that both limit switches are turned off or provide a zero output, and neither advance nor return power is applied to the slide motor. In zone 3, the slide 70 is ADVANCED onto advanced limit switch 76, switch 76 is turned on, switch 74 is turned off, and all power is turned off. In zone 4, slide 70 is ADVANCING FROM RETURNED such that returned limit switch 74 is on, advanced limit switch 76 is off and advance power is applied to slide motor 62. In zone 5, slide 70 is ADVANCING BETWEEN the limit switches, both limit switches being turned off and advance power still being applied. In zone 6, slide 70 is ADVANCING ONTO ADVANCED limit switch 76, with advance power still applied but advanced limit switch 76 turned on. Zones 7, 8 and 9 named RETURNING ONTO RETURNED, RETURNING BETWEEN and RETURNING FROM ADVANCED are similar to zones 4, 5 and 6 except that return power rather than advance power is turned on.

Thus, it will be seen that FIGS. 4A and 4B represent nine valid zones which reflect all of the physically possible operative conditions of the physical mechanism. The total number of possible zones is equal to the number of states per I/O raised to the power of the number of available I/O conditions. Thus, in this example, each I/O has two possible states, and there are a total of four I/Os available, presenting sixteen total possible zones, including seven invalid zones. For example, there are three possible invalid zones in which both advanced limit switch 76 and returned limit switch 74 are turned on, three possible invalid zones in which both advance motion power and return motion power are turned on, and the seventh invalid zone in which all I/Os are turned on. However, in accordance with an important feature of the present invention, it is not necessary to define all invalid zones. Rather, only valid zones need be defined, and all invalid zones are grouped into a single ERROR zone, zone 10 in FIG. 4B, in which both advance and return power are turned off and an error message is presented at display 60 (FIG. 1). As will be described in detail hereinafter, and in accordance with yet another important feature of the present invention, such display message provides a verbal indication which combines zone names and I/O names in such a way that a complete description of the error condition is provided based upon the last valid zone in which the mechanism was operating prior to entry into the ERROR zone. The coded zone table of FIG. 4B, along with tables corresponding to any other mechanisms at station 14, are stored in station RAM memory section 150 (FIG. 3).

Figure 5:
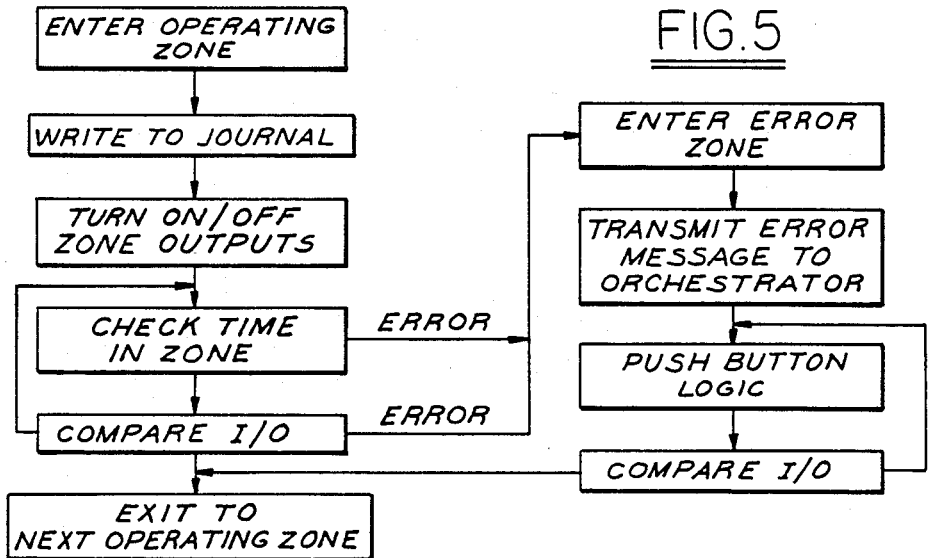
FIG. 5 is a flow chart illustrating operation of zone engine logic.

FIG. 5 illustrates operation of zone engine processing within logic MPU 132 in FIG. 3. Upon entry into a valid operating zone—i.e., a zone for which I/O has been defined and tabulated in the manner illustrated in FIG. 4B and stored within mechanism zone table memory section 150 in FIG. 3—an appropriate entry is written to journal memory section 154, whereby station memory contains a record of station operation. Journal 154 may comprise a "flight recorder" type of memory in which only a preselected number of previous zone entries are retained for purposes of analysis as required upon occurrence of an error condition. Following entry to journal 154, the appropriate zone outputs are turned on or off. For example, if the mechanism enters zone 1 from zone 7 (FIG. 4B), power to slide motor 62 (FIG. 2) must be turned off. Timer memory section 148 is then checked to determine the amount of time spent in the previous zone, in this case the amount of time spent in zone 7 following entry thereto from zone 8. Each zone has an associated predetermined maximum time-in-zone which, if exceeded, indicates an error condition. Next, the I/O image is compared to those expected and, failing recognition of an expected I/O image, operation is transferred to the ERROR zone. Note that there is a delay between energization of de-energization of the zone outputs and comparison with I/O image in order to allow the output signals to assume the desired level. Operation then cycles through timer check and I/O comparison until a change in the I/O image causing exit to the next operating zone or exit to the ERROR zone is detected. This cycle is repeated continuously and operation transferred from zone to zone as appropriate unless transferred to the ERROR zone or otherwise halted, such as by manual termination of automatic cycle operation.

Upon entry to the ERROR zone (FIG. 5), and error message is transmitted to orchestrator 56 for generation of an error message (as will be described in greater detail in connection with FIGS. 8 and 9). Such error message includes station and mechanism names, the last valid zone in which the station operated (taken from journal 154 in FIG. 2), and the condition which caused the error indication—i.e., unexpected change in input or exceeding maximum time-in-zone. Pushbutton logic 88 (FIG. 2) is operative to permit manual correction of the error condition. When the I/O image indicates correction of the error and return to autocycle, operation returns to the next valid zone—i.e., the next operating zone indicated by I/O image.

FIG. 6 schematically illustrates an important feature of the present invention. That is, information is effectively transmitted between operating stations so that each station is effectively aware of the part processing history or record of a workpiece arriving at that station. Thus, for example, tapping mechanism 32 at station 16 will not attempt to tap a hole which has not been drilled at station 12 and reamed at station 14. This feature of the invention not only prevents damage to the tapping bits at station 16 (which would eventually result in shutdown of the line because the tapping slide mechanism would remain too long in corresponding zone 5), but also permits restart of the line without manual inspection of all parts in the line and corresponding reset of the various stations. The processing records of all parts on the line are stored in memory section 146 (FIG. 3) at each station controller. The part process inhibit feature will be discussed in greater detail in connection with FIG. 7.

In accordance with another important feature of the invention, pushbutton logic 88 in ream station controller 30 (FIG. 2, as well as corresponding pushbutton logic in the other controllers) operates lighted pushbuttons 90 on panel 86 in such a way as to advise an operator of operating status and/or availability for operation at the associated mechanism. More specifically, a pushbutton lamp flashes slowly to indicate that the action associated with that pushbutton will be implemented if the pushbutton is pressed. The lamp flashes rapidly to indicate that the associated action is currently being implemented, either automatically or through manual depression of the button as previously described. The lamp remains steadily lit to indicate that the associated action has been completed, again either manually or in the automatic mode of operation. An unlighted lamp indicates that the action associated with this pushbutton will not be implemented even if the pushbutton is depressed.

Figure 7B:
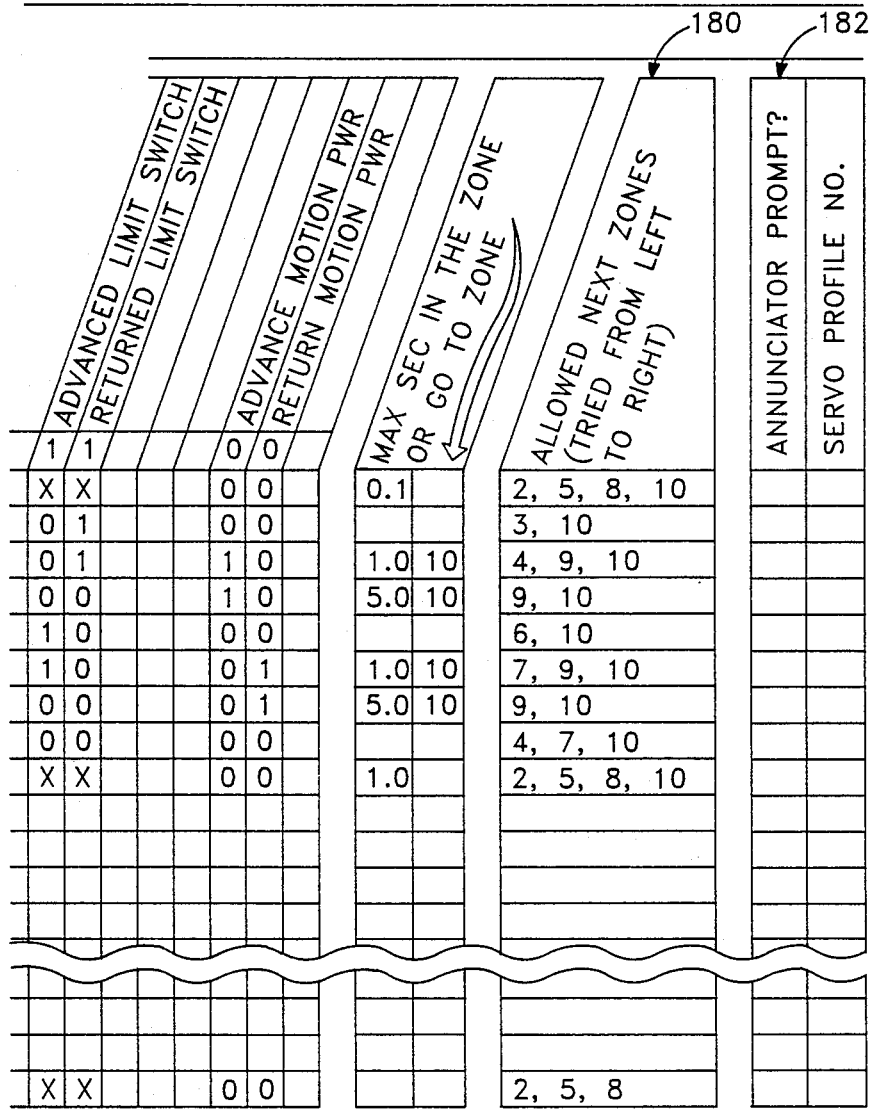
FIG. 7 is a functional block diagram illustrating the error message generator at the orchestrator computer in FIG. 1.
Figure 7C:
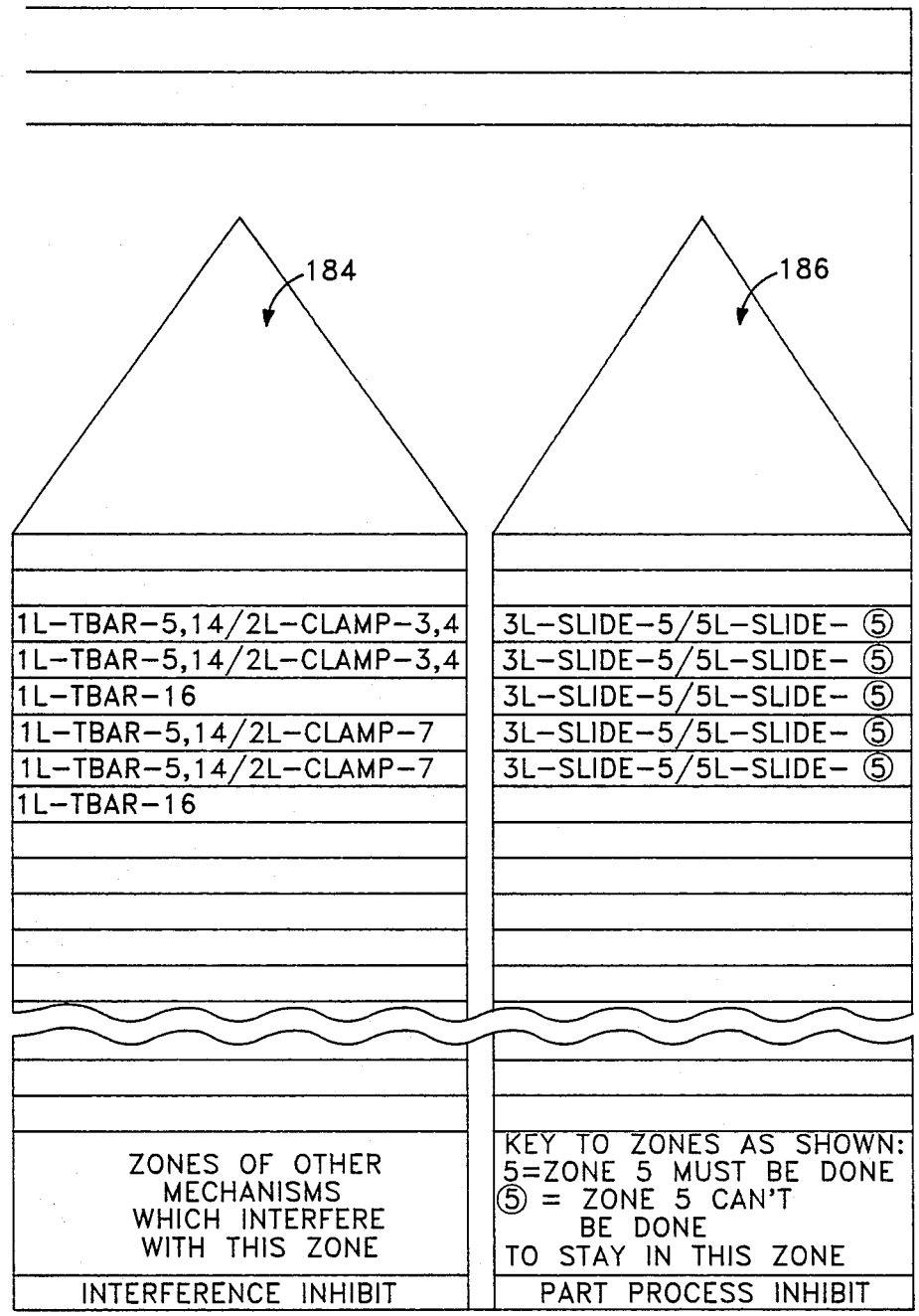

FIG. 7 illustrates a complete zone table for a ream slide mechanism in a working embodiment of the invention. The zones identified by name in the table of FIG. 7 differ from those identified in FIG. 4B in two respects. First of all, zones 6 and 7 in FIG. 4B, named ADVANCING ONTO ADVANCED and RETURNING ONTO RETURNED have been deleted. Secondly, these zones have been replaced by an INITIALIZING zone, zone 1 in FIG. 7, and by a COASTING TO STOP zone, zone 9 in FIG. 7. The INITIALIZING zone is necessary to provide a starting point upon initialization of the mechanism and associated controller. The zone table of FIG. 7 also includes command inputs as well as physical inputs from the limit switches, a column 180 of maximum times in zone where appropriate for each zone, a column 182 of allowable next zones, and a pair of inhibit columns 184, 186 for each zone as a function of potential interference with other zones in the overall system (column 184) and the part processing record inhibit previously discussed (column 186). The table of FIG. 7 is for operation of the MECHANICAL SLIDE (70 in FIG. 2) at the ream station, which is given the station name 5L. The mechanism at transfer station is called TBAR and the transfer station is named 1L, and the CLAMP mechanism is at station named 2L. The drill station (12 in FIG. 1) is named 3L.

When INITIALIZING, all inputs are initially ignored, motion power outputs are set to zero and, after a delay of 0.1 second (column 180), the physical or limit switch inputs are tested for an image corresponding to zones 2, 5 and 8 in that order (column 182). That is, upon initialization, the physical mechanism must be either RETURNED per zone 2, ADVANCED per zone 5 or STOPPED BETWEEN the RETURNED and ADVANCED positions per zone 8. If the physical inputs from the limit switches do not correspond to any of these zones, the zone engine (FIG. 5) automatically transfers to ERROR zone 10, and a corresponding error message is indicated at display 60 as will be described in detail in connection with FIGS. 8-9. Assuming that the slide is RETURNED upon initialization, operation transfers to zone 2 and awaits receipt of an ADVANCE SLIDE command. Note that there is no maximum time (column 180) is zone 2, and that the only allowable next zones (column 182) are zone 3, which is entered upon receipt of an ADVANCE SLIDE command, and ERROR zone 10 which is entered upon any other I/O change. Upon receipt of the ADVANCE SLIDE command, operation transfers to zone 3 in which advance motion power is applied to the slide motor unless inhibited by a transfer inhibit or a part process inhibit. In interference inhibit column 184, application of advance motion power is inhibited if the transfer mechanism TBAR at transfer station 1L is in zone 5 or 14 of that mechanism (in which transfer is taking place). Manifestly, the ream slide should not be advanced onto the workpiece if transfer is in process. Likewise, application of advance motion power is inhibited if the CLAMP mechanism at station 2L is in zone 3 or 4—i.e., when the clamp mechanism would physically interfere with reaming of the workpiece. In the part process inhibit column 186, application of advance motion power is inhibited if the SLIDE mechanism at drilling station 3L has not achieved zone 5 of that mechanism (which, because it is a MECHANICAL SLIDE, corresponds to zone 5 of FIG. 7). That is, advancement of the reaming mechanism is inhibited unless that part processing record in machine RAM section 146, which is updated after each machine cycle, indicates that the drill SLIDE mechanism at drilling station 3L (12 in FIG. 1) has already been ADVANCED against the part now present at the reaming station. Likewise, application of advance motion power is inhibited if the SLIDE mechanism at station 5L, which is the reaming station, has already achieved zone 5 on this part—i.e., has already reamed its hole. The maximum time in zone 3 is one second, which is to say that if more than one second is required to leave returned limit switch 74 (FIG. 2) operation transfers to ERROR zone 10. Operation can transfer, to ADVANCING BETWEEN zone 4, COASTING TO STOP zone 9 or ERROR zone 10. Operation then proceeds through the various zones with maximum times in zone, allowed next zones, interference inhibits and part process inhibits as illustrated in FIG. 7. The interference inhibit and part process inhibit columns of the zone table of FIG. 7 may be completed by the system designer or, more preferably, completed by computer during a system coding process based upon information supplied by the system designer in establishing operation of other system zones.

Figure 8:
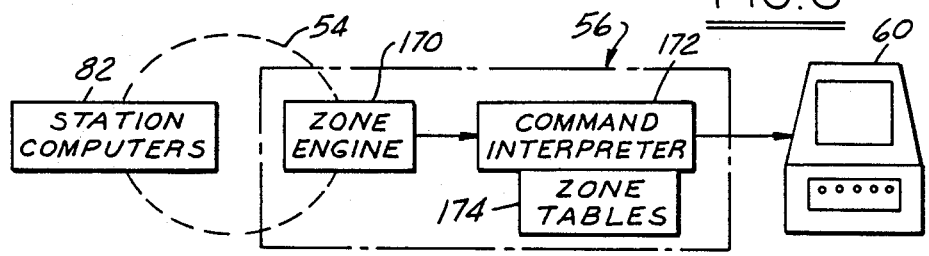
FIG. 8 illustrates a more complete mechanism zone table for the ream slide mechanism of FIGS. 1 and 2.

FIG. 8 is a schematic diagram which illustrates that portion of orchestrator controller 56 (FIGS. 1 and 2) which relates to generation of error messages at display 60. Station computers 82 (FIG. 2) communicate with orchestrator 56 through communication loop 54. As noted above, details of such communication are disclosed in copending U.S. application Ser. No. 757,225 filed July 19, 1985. Error message generation within orchestrator 56 is programmed as what might be termed a "pseudomechanism," which is to say that error message generation is programmed as if it were a physical mechanism, such as the mechanical slide hereinabove discussed in detail. A zone engine 170 similar to that in FIG. 5 receives the error signals from the station computers. A command interpreter 172 accesses zone tables 174, which include zone tables of the type in FIG. 7 for all stations, zones and pseudozones. From such zone tables, the error message is composed as a function of the error message signals and supplied to display 60.

Figure 9B:
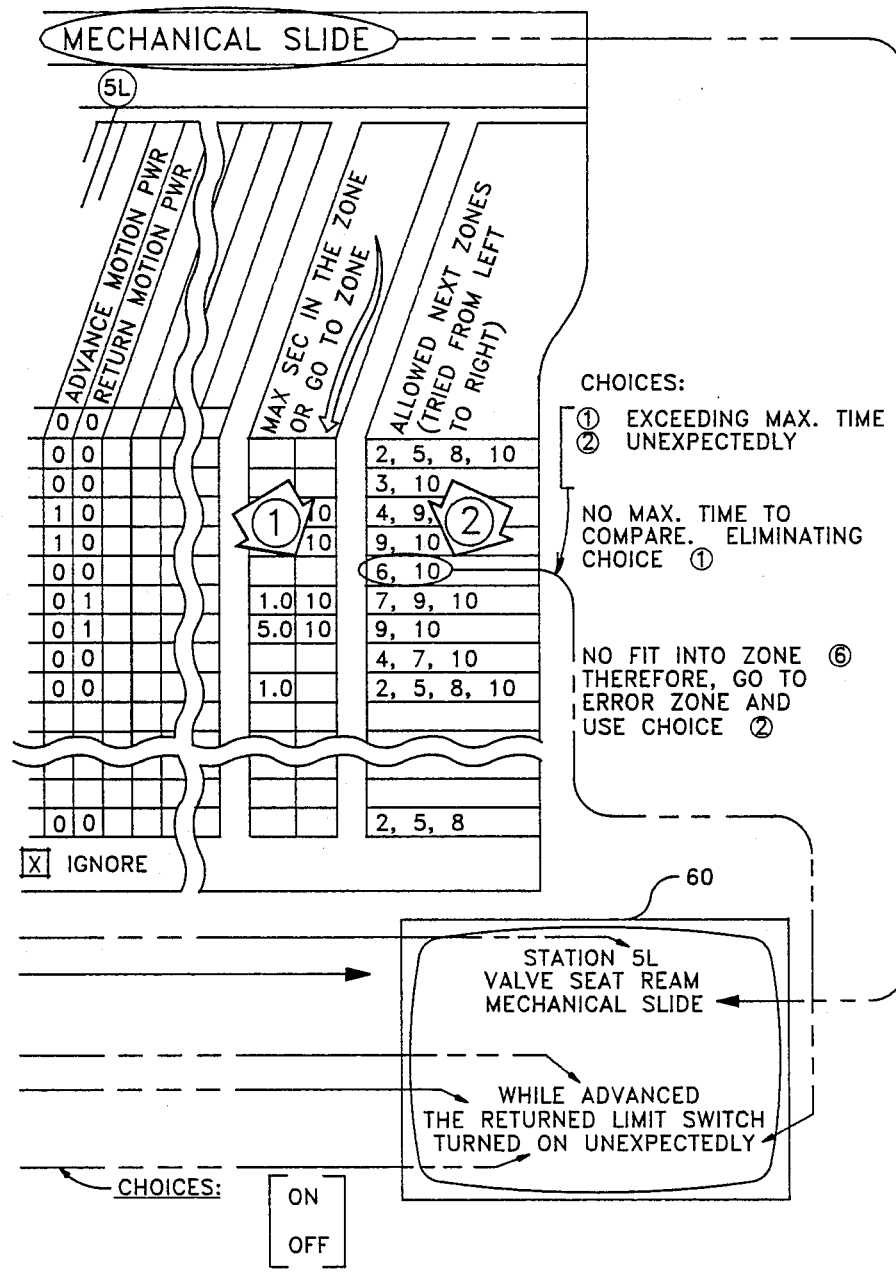
FIG. 9 illustrates error message operation at the orchestrator for an exemplary failure at the ream slide station.

FIG. 9 illustrates error message generation for a particular type of error—i.e., one in which returned limit switch 74 turned on while MECHANICAL SLIDE mechanism 70 at reaming station 5L was in the ADVANCED zone—i.e., zone 3 in FIGS. 4A and 4B or zone 5 in FIG. 7. Through access to tables 174, command interpreter 172 (FIG. 8) automatically displays station name "STATION 5L," a verbal description of station function "VALVE SEAT REAM," and the name of the failed mechanism "MECHANICAL SLIDE." The message continues with the preprogrammed standard introductory word"WHILE" followed by the name of the zone in which the mechanism was operating prior to entry into the error zone—i.e., the zone name "ADVANCED." THE message continues with the preprogrammed article "THE" followed by the name of the physical I/O which apparently failed—i.e., "RETURNED LIMIT SWITCH." The message continues with the preprogrammed word "TURNED" followed by "ON" or "OFF" depending upon the state to which the switch changed to create the error—in this case "ON." Finally, since the returned limit switch was not expected to turn on during operation in this zone, the message includes the work "UNEXPECTEDLY." Thus, the total message indicates that at "STATION 5L VALUE SEAT REAM MECHANICAL SLIDE" an error condition arose in which "WHILE ADVANCED THE RETURNED LIMIT SWITCH TURNED ON UNEXPECTEDLY."

In addition to a change in physical I/O image, an error can occur if the mechanism remains in a zone for a time greater than the corresponding maximum time-in-zone. For example, the slide may remain in RETURNING BETWEEN zone 7 for a time greater than the maximum time of five seconds. In this case, the error message at display 60 would read "STATION 5L VALUE SEAT REAM MECHANICAL SLIDE WHILE RETURNING BETWEEN EXCEEDED MAXIMUM TIME." Thus, command interpreter 172 (FIG. 8) and preprogrammed zone tables 174 together comprise an error message composer which automatically associates predefined text with error messages received from the station computers. It will be noted in particular that this feature of the invention coordinates with the use of predefined zone logic as hereinabove described since examination of the zone name, mechanism name, zone image and unexpected event effectively defines the error message. The system thus presents the diagnosis of the problem in a standard language readily understood by humans. The operator immediately identifies the fault without further thought or interpretation of logic sequences of relay contacts or the like. It will be appreciated that the error messages themselves are not preprogrammed, only individual message segments associated with specific conditions. Thus, the designer need not consider all possible combinations of errors. Indeed, for the MECHANICAL SLIDE mechanism of FIG. 9, the total number of possible error messages is equal to the number of zone names (nine) multiplied by the number of I/O names (four) multiplied by the number of possible I/O states (two) multiplied by the number of terminations ("EXCEEDING MAX TIME" or "UNEXPECTEDLY"—i.e., two). Thus, one hundred forty-four possible error messages are composable without explicit extra programming relating to each message individually.

Coding of a complete system involves a number of stages. First of all, a part process is defined as a function of operations to be performed on the workpieces. In the example of FIG. 1 hereinabove discussed in detail, five physical operations are performed—i.e., drilling, reaming, tapping, clamping and transfer. Thus, as a second step, the definitions of each station machine follows from the process definition, and in turn leads to definition of the physical mechanism or mechanisms at each location. As hereinabove noted, a mechanism is a device which provides a single motion and cannot interfere with itself. In the example discussed each station includes a single mechanism. However, there is no constraint on the number of mechanisms at a station. For example, the ream motor could be operated as a separate mechanism, and the collective clamp mechanism can be replaced by a separate clamp mechanism at each station. Regardless of the number of mechanisms in the system, implementation proceeds exactly as described herein. In addition, as noted above, there are a number of pseudomechanisms that must be defined which do not relate to a particular physical mechanism but which are needed to operate the overall system. Such pseudomechanisms may include initialization, auto cycling and/or error message generation.

Following identification of mechanisms, the system designer must define the allowable or valid zones for each mechanism along lines previously discussed in connection with FIGS. 4A and 4B, and also define mechanism-to-mechanism interferences among the various mechanisms within a single station and among the various stations. For example, none of the slides in the system of FIG. 1 can be advanced while the transfer mechanism 50 is operating or until the clamp bar 44 is in the clamped position. Similarly, the clamp bar 44 cannot be brought into clamped position while the transfer mechanism 50 is operating, and conversely the transfer mechanism cannot be operated until the clamp bar is rotated out of clamping position. These and other mechanism-to-mechanism interferences are defined by the system designer and placed either directly or, more preferably, by computer into the complete zone table of each system mechanism as illustrated in FIG. 7. Likewise, part process inhibit data is compiled by the system designer and placed in the zone table for each operating mechanism, either directly or by computer, as illustrated in and hereinabove discussed in connection with FIG. 7.

It will be noted that, although the system coding process described above can be a time consuming operation, control coding follows inherently and logically from overall system design and requirements. Furthermore, the system design process is, in essence, a constraint design process rather than an enablement design process. Two benefits result. First, since system operation is constraint limited, the system is permitted to operate to its maximum capacity without requiring the system designer actually to determine maximum system capacity. Secondly, the system designer is not required to anticipate all possible situations of system operation.

An appendix to this application includes a complete software listing for operation of the exemplary mechanical slide mechanism hereinabove discussed in detail, for implementing pushbutton logic 88 (FIG. 2) as described and for generation of the error messages as illustrated in FIG. 9.

The invention claimed is:

1. A machine control system which comprises, in combination, a machine including means for producing motion at said machine and means for sensing machine conditions, and control means responsive to a predefined input from said condition-sensing means for providing a predefined output to said motion-producing means, characterized in that said control means comprises:
    means for tabulating said predefined input and output in a combination representative of a preselected set of operation of said machine, each said combination representing an input/output image indicative of a corresponding zone in said preselected set, and said corresponding zone having associated therewith an allowed next zone with at least one of said corresponding zones having associated therewith a plurality of allowed next zones;
    means for monitoring said predefined input and output responsive to a change in said predefined input and output to formulate a new input/output image;
    means for comparing said new input/output image to an input/output image in said tabulating means indicative of said allowed next zone; and
    means for indicating an error condition in the event that said new input/output image does not match that of said next zone in said preselected set.

2. The system set forth in claim 1 wherein said tabulating means includes means for establishing a maximum operating time in a zone of said predetermined set;
    wherein said comparing means includes means for measuring time of operation within a zone in said preselected set and means for comparing said time of operation to said maximum operating time; and
    wherein said error-condition indicating means includes means for indicating said error condition in response to a change in said predefined input and output when said time of operation in said zone is outside of said maximum operating time.

3. The system set forth in claim 1 wherein said error-condition indicating means includes means for providing an error signal indicative of an input and output condition at said machine upon detection of an error condition, and means responsive to said error signal for formulating and displaying an error message indicative of said error condition.

4. The system set forth in claim 3 wherein message-formulating means includes a table of predefined error message segments corresponding to an error condition at said machine, and means responsive to said error signal for gathering error message segments from said table as a function of said error signal and thereby formulating said error message.

5. The system set forth in claim 4 wherein said message-formulating means comprises a visual display.

6. The system set forth in claim 3 wherein said control means further comprises memory means for storing an input/output image data for operating zones of said machine; and
    wherein said error-condition indicating means comprises means for retrieving data from said memory means indicative of an operating zone, and means for formulating said error message as a function of said input/output image data.

7. A machine control system which comprises, in combination, a machine including motion-producing means for producing motion at said machine and condition-sensing means for sensing machine conditions, and control means responsive to a predefined input from said condition-sensing means for providing a predefined output to said motion-producing means, characterized in that said control means comprises:
    means for tabulating said predefined input and output in a combination representative of a preselected set of operations of said machine, each said combination representing an input/output image indicative of a corresponding zone in said preselected set;
    means for monitoring said predefined input and output responsive to a change in said predefined input and output to formulate a new input/output image;
    means for comparing said new input/output image to an input/output image in said tabulating means wherein said means for comparing indicates a next zone in said preselected set;
    means for indicating an error condition in the event that said new input/output image does not match that of a next zone in said preselected set; and
    means for initiating operation of said machine at each corresponding zone of said preselected set, illumination means associated with each said initiating means, and energizing means for energizing said illumination means at a state of a plurality of illumination states to indicate one of a plurality of available operating modes at said machine.

8. The system set forth in claim 7 wherein said initiating means and said illumination means comprises an illuminated pushbutton associated with a preselected operating zone of said control means and a corresponding action at said machine, and wherein said energizing means comprises means for illuminating said illuminated pushbutton in one of said plurality of illumination states as a function of availability of operation of said corresponding action at said machine.

9. The system set forth in claim 8 wherein said energizing means comprises means for flashing said illuminated pushbutton at a first rate to indicate availability of said corresponding action associated with said pushbutton, means for flashing said illuminated pushbutton at a second rate different from said first rate when said corresponding action is in operation, means for steadily illuminating said pushbutton when said corresponding action is completed, and means for extinguishing said illuminated pushbutton when said corresponding action is not available for implementation.

10. A method of operating a machine capable of performing a plurality of physical operations in a preselected sequence wherein said machine is controlled through input and output devices, said method comprising the steps of:

establishing a set of machine operations defined by a set of operating zones, each zone of said operating zones having a corresponding input/output image of inputs and outputs from said input and output devices and each zone having a corresponding allowed next zone with at least one of said operating zones having a plurality of allowed next zones;

monitoring inputs and outputs from said input and output devices during a step in said plurality of physical operations and comparing said inputs and outputs to said corresponding input/output image associated with said step;

advancing machine operation to a next step in said set of machine operations when a change in said inputs and outputs produces a zone image corresponding to said allowed next zone; and indicating an error condition when a change in said inputs and outputs produces a zone image other than that corresponding to said allowed next zone.

11. The method set forth in claim 10 comprising the additional steps of:

monitoring a time of operation in each zone of said operating zones;

comparing said time of operation in a particular zone to a predetermined maximum time associated with said particular zone; and indicating said error condition when said time of operation is greater than said predetermined maximum time.

12. The method set forth in claim 11 comprising the additional steps of:

storing a plurality of predetermined message segments in plain text corresponding to actions to be taken in said operating zones and input and output conditions at said machine;

establishing an error signal in response to an indication of said error condition, said error signal including segments reflecting input and output conditions at said machine in predetermined sequence upon detection of said error condition;

composing an error message as a sequence of said predetermined message segments corresponding to and in the order of said error signal segments; and displaying said error message.

13. A method of controlling a machine mechanism for obtaining a single non-interfering machine motion through an operating sequence, said method comprising the steps of:

(a) coupling input/output means to said machine mechanism for providing input/output signals which vary as a function of motion of said machine mechanism through said sequence;

(b) establishing a plurality of distinct mechanism operating zones each characterized by a combination of said input/output signals and each having associated therewith an allowed next operating zone, said operating zone including at lest two zones corresponding respectively to one or more operating states of said machine mechanism and an error zone, and at least one of said operating zones is associated with a plurality of next operating zones;

(c) monitoring said input/output signals in each of said plurality of distinct mechanism operating zones for the combination of said input/output signals corresponding to said allowed next operating zone;

(d) advancing machine operation to said allowed next operating zone upon detection of a corresponding input/output signal combination; and (e) advancing machine operation to said error zone and indicating an error condition upon detection of a combination of an input/output signal other than an input/output signal corresponding to a subsequent mechanism operating zone.

14. The method set forth in claim 13 for controlling a machine system which includes at least two of said machine mechanisms, said steps (a)–(c) being carried out independently for each said machine mechanism, said method comprising the additional steps of:

(f) identifying operating zones for said at least two machine mechanisms in which operation of said at least two machine mechanisms interfere with each other; and (g) inhibiting advancement of operation in said step (d) for a selected one of said machine mechanisms when an operating zone of another of said machine mechanisms is one identified in said step (f) such that advancement could cause interference between said at least two machine mechanisms.

15. The method set forth in claim 13 for controlling a machine system which includes at least two of said mechanisms for performing operations in a predetermined sequence in which operation of a first of said mechanisms is a prerequisite to operation of a second of said mechanisms, said steps (a)–(c) being carried out independently for each of said mechanisms, said method comprising the additional steps of:

(f) storing information indicative of operation of said first mechanism, and (g) inhibiting advancement of operation in said step (d) for said second mechanism in the absence of information stored in said step (f) indicative of operation of said first mechanism.

16. A machine control system which includes a plurality of machine mechanisms for performing operations in a sequence and means for controlling operation of said mechanisms comprising:

input/output means couples to each of said plurality of machine mechanisms for providing input/output signals in combinations indicative of a plurality of stages of operation associated with said plurality of machine mechanisms; and control means coupled to each of said plurality of machine mechanisms, said control means including means for receiving input/output signals from an associated input/output means, said control means having stored therein a table of predefined operating zones for each of said plurality of machine mechanisms as a function of differing combinations of an associated input/output signal and having associated therewith an allowed next operating zone wherein a least one of said operating zones has associated therewith a plurality of next operating zones, said control means having further stored therein tables of predefined zones in which operation of said plurality of machine mechanisms could interfere with each other, and means for driving each of said plurality of machine mechanisms as a combined function of said associated input/output signal and an indicia stored in said tables.

17. The system set forth in claim 16 for performing operations on a workpiece in said predetermined sequence, an operation performed by a first of said mechanisms being a prerequisite to performance of an operation by a second of said mechanisms in said sequence, said control means further including means having stored therein an indicia indicative of operations performed on a workpiece in said system, and means for inhibiting operation of said second mechanism of said workpiece when said indicia indicates a lack of operation of said first mechanism on said workpiece.

18. A machine control system which comprises, in combination, a machine including means for producing motion at said machine and means for sensing machine conditions, and control means responsive to predefined inputs from said condition-sensing means for providing predefined outputs to said motion-producing means, characterized in that said control means further comprises
means for manually initiating operation of said machine at each of a plurality of differing zones in a preselected set of operations at said machine, illumination means associated with each said manually-initiating means, and means for energizing said illumination means at differing illumination states to indicate differing available operating modes at said machine.

19. The system set forth in claim 18 wherein said manually-initiating means and said illumination means comprises illuminated pushbuttons each associated with a preselected operating zone of said control means and a corresponding action at said machine, and wherein said energizing means comprises means for illuminating each said illuminated pushbutton in differing illumination modes as a function of availability of operation of the corresponding action at said machine.

20. The system set forth in claim 19 wherein said energizing means comprises means for flashing each said illuminated pushbutton at a first rate to indicate availability of action associated with the said pushbutton, means for flashing each said illuminated pushbutton at a second rate different from said first rate when the associated said action is in operation, means for steadily illuminating each said pushbutton when the associated said action is completed, and means for extinguishing each said illuminated pushbutton when the associated said action is not available for implementation.

21. An apparatus for controlling a machine comprising:
memory means for storing at least two input/output images, each input/output image having associated therewith a present zone and an allowed next zone with at least one input/output image having associated therewith a plurality of allowed next zones;
monitoring means for receiving an input requiring a change in a present input/output image to a new input/output image;
means for comparing an input/output image of said allowed next zone with said new input/output image;
means for executing said input and for replacing said present input/output image with said input/output image of said allowed next zone if said new input/output image matches said allowed next none; and
means for indicating an error condition when said new input/output image does not match said input/output image of said allowed next zone.

22. The apparatus of claim 21 further comprising timing means for measuring a duration of time in said present zone wherein said apparatus moves to a specified allowed next zone when said duration exceeds a predetermined duration for said present zone.

23. The apparatus of claim 21 further comprising interference inhibit means for inhibiting said execution means when execution could interfere with a current zone of a second apparatus.

24. The apparatus of claim 21 further comprising part process means for inhibiting said execution means when a part process record of a workpiece to be worked on by said apparatus indicates said workpiece is not prepared for an operation to be performed.

25. The apparatus of claim 21 wherein said error means comprises:
a first table containing an identification of said apparatus;
a second table containing a zone name of said present zone;
a third table containing an input/output name of said input/output image;
a fourth table containing a current status of said present zone; and
a fifth table containing a plurality of error designations wherein said error indicating means formulates an error message indicative of said error condition.

26. A method for controlling a machine having a present zone, an input/output image of said present zone, and at least two allowed next zones, wherein said method comprises the steps of:
receiving an input representative of a new input/output image of said machine;
comparing an input/output image of a first allowed next zone of said at least two allowed next zones with said new input/output image;
changing said present zone to said first allowed next zone if said input/output image of said first allowed next zone matches said new input/output image; and
comparing an input/output image of a second allowed next zone of said at least two allowed next zones with said new input/output image if said new input/output image did not match said input/output image of said first allowed next zone.

27. A method for controlling a machine having a present zone, an input/output image of said present zone, and a plurality of allowed next zones, wherein said method comprises the steps of:
(a) receiving an input representative of a new input/output image of said machine;
(b) comparing an input/output image of a particular allowed next zone of said plurality of allowed next zones with said new input/output image;
(c) changing said present zone of said machine to said particular allowed next zone if said input/output image of said particular allowed next zone matches said new input/output image; and
(d) repeating steps (b) and (c) if said input/output image of said particular allowed next zone does not match said new input/output image until all of said plurality of allowed next zones have been compared to said new input/output image.

* * * * *